United States Patent
Doody et al.

(10) Patent No.: US 12,021,652 B2
(45) Date of Patent: Jun. 25, 2024

(54) WIRELESS COMMUNICATION SYSTEM WITH PoE NETWORK SWITCHES FOR MOVING VEHICLES

(71) Applicant: Icomera AB, Gothenburg (SE)

(72) Inventors: John Doody, Gothenburg (SE); Finbarr Long, Gothenburg (SE); Mats Karlsson, Gothenburg (SE)

(73) Assignee: Icomera AB, Gothenburg (SE)

( * ) Notice: Subject to any disclaimer, the term of this patent is extended or adjusted under 35 U.S.C. 154(b) by 0 days.

(21) Appl. No.: 17/579,350

(22) Filed: Jan. 19, 2022

(65) Prior Publication Data

US 2022/0231878 A1   Jul. 21, 2022

(30) Foreign Application Priority Data

Jan. 20, 2021   (SE) .................................. 2150056-6

(51) Int. Cl.
*H04L 12/40* (2006.01)
*H04L 12/10* (2006.01)
(Continued)

(52) U.S. Cl.
CPC .............. *H04L 12/40* (2013.01); *H04L 12/10* (2013.01); *H04L 49/351* (2013.01); *H04L 67/12* (2013.01); *H04L 2012/40273* (2013.01)

(58) Field of Classification Search
CPC ...... H04W 36/08; H04W 48/04; Y02B 70/00; H04L 41/12; H04L 12/10; H04B 7/0413; G06F 13/4282; G06F 1/3287

See application file for complete search history.

(56) References Cited

U.S. PATENT DOCUMENTS 9,155,171 B1 *  10/2015  Hughes ................ H05B 47/185
2007/0061056 A1 *  3/2007  Valsorda ................ H04L 67/12
                                                          701/20
(Continued)

FOREIGN PATENT DOCUMENTS

DE   102015216597 A1   3/2017
EP       2073435 A1    6/2009
(Continued)

OTHER PUBLICATIONS

Swedish Office Action for Swedish Application No. 2150056-6, dated Jun. 22, 2022, (11 pages).
(Continued)

*Primary Examiner* — Mahran Y Abu Roumi
(74) *Attorney, Agent, or Firm* — Kagan Binder, PLLC (57) ABSTRACT

A method and system for a wireless communication system for a moving vehicle having a plurality of carriages is disclosed. The system comprises at least one internal network onboard said vehicle and at least one router, connected to the internal network and to at least one exterior mobile network, wherein the internal network comprises a plurality of network switches, connected together by cables, wherein the network switches are Power over Ethernet (PoE) switches. In at least one of the network switches it is determined if an input power received from a power supply is below a minimum power level. In case it has been determined that the input power level is below the minimum power level, power is received as Power over Ethernet from at least one of the other network switches, and the switch continues at least part of the network switch operation also when powered by the at least one other network switch.

19 Claims, 3 Drawing Sheets

(51) Int. Cl.
    *H04L 49/351*    (2022.01)
    *H04L 67/12*     (2022.01)

(56)            References Cited

U.S. PATENT DOCUMENTS

2010/0091663  A1     4/2010  Takeyama et al.
2014/0312698  A1*   10/2014  Kastner ................. H04L 12/10
                                                         307/65
2017/0223592  A1*    8/2017  Karlsson ............... H04W 36/08
2018/0020334  A1*    1/2018  Karlsson .............. H04B 7/0413
2022/0206560  A1*    6/2022  Yu ....................... G06F 13/4022

FOREIGN PATENT DOCUMENTS

EP           2518977  A1    10/2012
EP           2943011  A1    11/2015
EP           3280164  A2     2/2018
EP           3280164  A3     4/2018
EP           2774315  B1     9/2018
WO        2015059496  A1     4/2015

OTHER PUBLICATIONS

Espacenet English language abstract for DE 102015216597.
Extended European Search Report for European Application No. 22151824.4, dated Jun. 15, 2022, (4 pages).
E-Space net English Abstract for EP2774315B1.

* cited by examiner

WIRELESS COMMUNICATION SYSTEM WITH PoE NETWORK SWITCHES FOR MOVING VEHICLES

CROSS-REFERENCE TO RELATED APPLICATIONS

This application claims priority to Swedish Patent Application having serial number 2150056-6, filed Jan. 20, 2021 and titled "WIRELESS COMMUNICATION SYSTEM WITH POE NETWORK SWITCHES FOR MOVING VEHICLES", of which is incorporated herein by reference in their entirety.

TECHNICAL FIELD OF THE INVENTION

The present invention relates to a wireless communication system for moving vehicles, such as trains.

BACKGROUND

The demands on wireless communication capabilities in today's society are increasing rapidly. In particular, there is an increasing demand from passengers to be able to communicate through mobile phones and other handheld devices when traveling. Furthermore, there is also a rapidly growing demand to be able to get access to the Internet with laptops, PDAs, smartphones, and the like when traveling, for example, by train. However, train carriages are made of metal, and even the windows are normally covered with a thin metal film. Thus, train carriages are often shielded compartments, and direct communication between terminal antennas within the carriages and externally located antennas is difficult to obtain. Further, in regards to recent developments in the field of smartphones, and the way these are commonly used, with e.g. continuously operating applications, many smartphones are active at all times, meaning that many handovers are required when the train moves. Even though this problem is common for all moving vehicles, it is especially pronounced for vehicles moving at high speed, such as trains.

To this end, moving vehicles, such as train carriages, are often provided with an external antenna connected to a repeater unit within the carriage, which in turn is connected to an internal antenna. Hence, the communication between the passengers' terminals (e.g. handheld devices) and the operator antennas outside the vehicle occurs through the repeater unit. Similarly, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 by the same applicant. This method has greatly improved the reliability of high-bandwidth wireless communication for trains and other large vehicles.

For large vehicles, such as trains with several carriages, an internal network must be provided, forming an Ethernet backbone inside the train. Such an Ethernet backbone may be provided in the form of a plurality of network switches, connected together by cables. To each network switch, wireless access points may be connected, and also other local resource devices. The network switches form a chain, where incoming data from the router is forwarded from one network switch to the next, in order to reach the intended destination, and in the opposite way when local data from clients connected to a network switch should be forwarded to the router.

However, such an Ethernet backbone is rather sensitive, and if one of the switches fails, typically due to power failure to the switches, the entire chain will be broken, effectively disconnecting not only the failing switch from access to the router and the external network, but also all downstream switches connected to router through the failing switch.

As a remedy to this problem, it is known to use so-called bypass relays, which are electromechanical relays which automatically closes when there is a power loss, thereby bypassing communication through the, at this time inoperative, failing network switch. However, use of such bypass relays only partially solves the problem, since the failing switch is still inoperative. Further, such bypass relays are relatively costly, significantly adding to the costs of the wireless communication system. Further, such bypass relays are in themselves a source of error, since these electromechanical devices are not very durable, with short longevity, and will typically break after a while, thereby requiring additional service and repair activities.

In addition, the present bypass relay solution is not compatible with high throughput switches, such as 10 Gigabit Ethernet switches. The increased signal speeds used in 10G Ethernet pose significant installation challenges, as they severely limit the length of twisted pair cable which can be used. These issues are exacerbated in situations where passive bypass relays are used to protect against the failure of a switch in the signal path. For example, in a train installation where the inter-carriage cable length is greater than 50% of the limit for 10G transmission, the enabling of a passive bypass relay will result in the cable length exceeding the allowable limit (as the two cable lengths would be added together along with a number of additional cable connectors). This will result in a degradation in performance in the connection, increased error rates and/or the connection stepping back to 1G operation, thereby impacting system throughput.

There is therefore a need for an improved train communication system which provides better and more secure and stable data communication inside the train, thereby enabling a more efficient utilization of external mobile networks. Even though the above discussion is focused on trains, similar situations and problems are at least to some extent encountered in other types of moving multi-carriage vehicles, such as trams.

SUMMARY OF THE INVENTION

It is therefore an object of the present invention to provide a wireless communication system and a method for operating a wireless communication system for moving vehicles, and in particular trains, which alleviates all or at least some of the above-discussed drawbacks of the presently known systems.

Another object of the invention is to provide a wireless communication system for moving vehicles which is dynamic and robust against onboard power failures and the like.

These objects are achieved by means of a wireless communication system for a moving vehicle, and a method for operating such a system, as defined in the appended claims.

According to a first aspect of the present invention, there is provided a wireless communication system for a moving vehicle having a plurality of carriages, said wireless communication system comprising:

at least one internal network onboard said vehicle;

at least one router, connected to said internal network, and configured to: receive and transmit wireless data communication to and from a stationary communication server outside said moving vehicle through at least one exterior mobile network via at least one antenna, wherein said at least one exterior mobile network provides at least one data link; and receive and transmit data packets to and from at least one client onboard the moving vehicle through at least one internal network;

wherein said internal network comprises a plurality of network switches, connected together by cables, wherein the network switches are Power over Etherenet (PoE) switches, each network switch comprising:

a first port connectable to another of said plurality of network switches or to the router;

a second port connectable to another of said plurality of network switches or to the router;

at least one additional port connectable to a wireless access point and/or a local resource device;

a power inlet, for receiving power from a power supply; and a detection element arranged to be activated when input power on said power inlet falls below a minimum power level, wherein upon activation of said detection element, each network switch is further arranged to receive power from at least one of the other network switches through said first and/or second ports, and to continue at least part of its operation also when powered by the at least one other network switch.

The "activation" of the detection element should be construed broadly, comprising any change of state of the detection element to control the powering of the network device. The detection element may be realized as an electronic circuit, e.g. comprising diodes and/or transistors, to provide switching of the powering of the switch from the ordinary power supply to powering by Power over Ethernet from one or more of the neighboring switches. Additionally, or alternatively, the detection element may a sensor or the like to detect the power level of the input power from the power supply, and to control switching of the powering to PoE when the power level from the power supply falls beneath the minimum power threshold.

With the present solution, in the event of a power failure, the switches will be continuing their operation, at least to some extent, powered by the network switch being arranged upstream or downstream from the switch experience a failure. The power is supplied by the Ethernet cable, as Power over Ethernet. How much power that can be forwarded to the switch with the failure depends on various factors, but in most cases up to 60 W can be provided from each switch, such as 20-60 W, or 20-50 W. A normal power supply unit (PSU) for a switch provides about 150 W. Thus, the PoE power is sufficient to maintain most of the operations of the failed switch, and in particular in situations where PoE power is supplied from both the neighboring switches.

Hereby, an active bypass can be provided allowing, data to be forwarded through the failed switch in the same way as before the failure.

Thus, the problems related to passive bypass relays are overcome, since the cables are now used for active communication, in the same way as prior to the power failure.

In addition to providing a bypass in an improved way, compared to the previously known passive bypass relays, the switch with the failure may still continue with some, or even all, of its other operations. Thus, it may still be used for at least continuing with its most crucial operations. For example, it may continue to service local resource devices of importance to maintain security and safety onboard the vehicle, such as surveillance cameras, displays to provide information to the passengers, etc. It may also continue to operate a wireless access point, to enable wireless communication for the passengers. However, other local resource devices, and in particular devices requiring much power, could be disconnected.

The present invention provides a simpler and more cost-effective solution to switches experiencing failures, since it can easily be implemented in conventional switch networks, and also improves the reliability of the system. Further, since no electromechanical elements are needed, the stability and longevity of the system are also improved.

Since the failing switch continues to be at least partly in operation, it is also possible to evaluate the failing switch by connecting to sensors in the switch etc., either through the Ethernet backbone connection, e.g. via the router or any of the other connected switches, or by connecting directly to a port of the switch. Hereby, the status of the switch and possible causes of the error can be determined, thereby facilitating maintenance and repair of the switch.

The wireless communication system comprises an internal network, providing an Ethernet backbone, which comprises a number of switches, such as 10G switches, connected together, e.g. in a daisy-chain configuration or as a redundant ring. Each switch is PoE capable and has, at a minimum, one port connected to an upstream switch, one port connecting to a downstream switch, and at least one port connecting to local resources.

Each switch has a detection element, a circuit, which detects the status of the input power. When input power is good, the switch will provide POE power to all ports except that ports connected to the upstream and downstream switches, and power its associated circuitry from its input supply. When the input power fails, the detection element, i.e. the power status circuit, will enable a power path from the cable connected to the upstream switch, thereby maintaining the functionality of the switch even in the failure case. In this failing case, the circuit may also disable PoE power to some or all of the ports. This will, in the event of failure and disabling of some of the ports, cause the switch to become an active Ethernet repeater, or a switch with reduced operation.

Preferably, at least some of the plurality of network switches are arranged in different carriages of the moving vehicle. In one embodiment, each switch is arranged in a separate carriage. In another embodiment, each carriage is provided with at least one switch. In some embodiments, two or more switches may be provided in one and the same carriage, in order to serve different parts of the carriage, in order to provide different services, and/or to provide redundancy.

In one embodiment, the network switches are connected through said cables in a daisy chain configuration. Hereby, the switches are connected in a single chain, from a first switch to a last switch, possibly through one or more intermediate switches. A daisy chain configuration is advantageous in that is minimizes the need of cables to connect the switches, since only a single cable is provided along the entire length of the network.

In another embodiment, the network switches are connected through the cables in a redundant ring configuration. In such an embodiment, additional cables are needed, since double cables are needed along the entire length of the network. However, in this embodiment, each switch has two communication paths to communicate with the router, and to get access to the external network(s). Thus, even though this embodiment is somewhat more costly to implement, it provides additional redundancy and safety. The ring structure maintains the ethernet backbone's function, even if a switch experiences total failure, or is removed.

The network switches may be arranged, upon activation of said detection element, to continue to forward data communication received on said first port to said second port when powered by the at least one other network switch.

The network switches may also be arranged, upon activation of said detection element, to continue to send or receive data communication through at least one of said additional port(s).

The network switches may be arranged, upon activation of said detection element, to restrict or prohibit Power over Ethernet through said at least one additional port. For example, Power over Ethernet may be restricted to at least one of: a) to be available only on one or several predetermined ports of said additional ports; b) to be available only on ports where the power level is below a predetermined maximum power level; and c) to be available only to predetermined types of local resource devices. Additionally, or alternatively, the Power over Ethernet may be restricted to be provided only to predetermined, safety critical local resource devices. Additionally, or alternatively, the network switches may be arranged, upon activation of said detection element, to prohibit outgoing Power over Ethernet on all the additional ports.

The network switches are preferably 10 Gigabit Ethernet switches, operating in accordance with the IEEE 802.3 standard. For such switches, the present invention is particularly useful and advantageous. However, it may also be used for other types of switches, such as 1 Gigabit Ethernet switches. For example, the present solution may be highly advantageous in 1 Gigabit Ethernet networks, and also in any other Ethernet networks, where the inter-switch cable length is greater than 50% of the maximum allowable length.

The cables may be twisted pair cables with metal conductors.

The moving vehicle is preferably a train.

The wireless communication system of any one of the preceding claims, wherein at least one of the network switches has at least one of said additional ports connected to a wireless access point, and preferably a Wi-Fi access point, operating in accordance with an IEEE 802.11 standard. Preferably, all, or almost all, of the network switches have ports connected to such wireless access points. One or several of the network switches may also have two or more of the additional ports connected to such wireless access points. For example, there may be a need for more than one wireless access point in carriages for various reasons, such as in carriages having several levels, so-called double-deck installations, or if the coach is divided into separate sections with glass or metallic doors between them.

By the provision of wireless access points, a set of internal LANs may be provided inside the moving vehicle for providing wireless communication between the router, via the network switches, and at least one client (sometimes referred to as terminal) onboard. In one exemplary embodiment, each internal LAN may provide WiFi communication between the network switches and at least one client onboard the moving vehicle. In other words, each carriage is preferably associated with one or more internal LAN(s) provided by only one network switch. Preferably, at least one such wireless access point is provided in each carriage. Each wireless access point is to be connected to a specific network switch of the plurality of network switches, such that a plurality of clients (or terminals) onboard the moving vehicle are effectively distributed among the plurality of network switches by dependence on the location of each client within the moving vehicle.

The "router" (or sometimes "mobile router") is a networking router, which is a machine that forwards data packets between computer networks, on at least one data link. The router may be mobile access router, and preferably a mobile access and applications router.

A controller in the router may be configured to evaluate a set of performance parameters of the at least one data link between the router and the at least one exterior mobile network, in order to assign data streams to the at least one data link at least partly based on the evaluated set of performance parameters. The controller can be provided by means of appropriate software, hardware or a combination thereof. The controller may be partly or wholly integrated into the router or a standalone unit connected to the router.

Each stationary communication server may be any server or site accessible through the exterior mobile network, such as a DNS server, an ISP infrastructure gateway, an aggregation gateway, a content provider server of interest to vehicle passengers, or the like. For all common applications of this invention, the stationary servers will constitute the Internet, but partly or purely private network applications are also feasible.

The router and the remote server (stationary communication server) are preferably connected through a plurality of exterior mobile networks, which are simultaneously useable. Also, the router is preferably arranged to communicate with the stationary communication server on at least two different data links (communication routes) having different characteristics, i.e. performance parameters, where the performance parameters can be measured and evaluated by the controller. This may be used to evaluate the links provided by a single router, and to distribute data streams between these links. The performance parameters may include at least one of: packet loss (intermittent failure for packets of data to arrive), latency (round-trip response time, hence responsiveness), throughput/bandwidth (overall rate of data transmission, whether current or potential) and a variety of radiophysical metrics, such as signal strength. The data streams may be forwarded on one or several links to and from a dedicated external server, which may be referred to as an aggregation server or gateway. The different links can thereby form a single virtual link between a router and the gateway.

The evaluation of a data link can for example be performed by the methods as described in EP 2 943 011 by the same applicant, said document hereby incorporated by reference. Furthermore, the router may use any available data links, such as two or more of e.g. GSM, Satellite, DVB-T, HSPA, EDGE, 1X RTT, EVDO, LTE, WiFi (802.11) and WiMAX; and combine them into one virtual network connection. In particular, it is preferred to use data links provided through wireless wide-area network (WWAN) communication technologies.

The router may comprise a plurality of modems for communication with the at least one exterior mobile network, wherein each modem is connectable to at least two external antennas in order to enable MIMO communication. Thus, the router may comprise several antenna ports per modem, enabling MIMO for the external communication, and the high bandwidth thereby provided can then be distributed to the internal clients with e.g. 802.11n. The modems comprised by the router may share a plurality of antennas, i.e. there may be for example two or four antennas arranged on the roof of a carriage which can only be utilized by one modem at the time. Alternatively, the carriages may have two or more antenna configurations, each antenna configuration including a plurality of antennas distributed on the exterior of the carriages, and where each configuration is simultaneously usable by two or more modems.

According to another aspect of the present invention, there is provided a method for operation of a wireless communication system for a moving vehicle having a plurality of carriages, said wireless communication system comprising:
  at least one internal network onboard said vehicle;
  at least one router, connected to said internal network and to at least one exterior mobile network, wherein said internal network comprises a plurality of network switches, connected together by cables, wherein the network switches are Power over Ethernet (PoE) switches;
wherein the method in one of said network switches comprises:
  determining if an input power received from a power supply is below a minimum power level;
  receive, in case it has been determined that the input power level is below said minimum power level, power as Power over Ethernet from at least one of the other network switches; and
  continue at least part of the network switch operation also when powered by the at least one other network switch.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles having a plurality of carriages, such as trams and the like.

Figure 1:
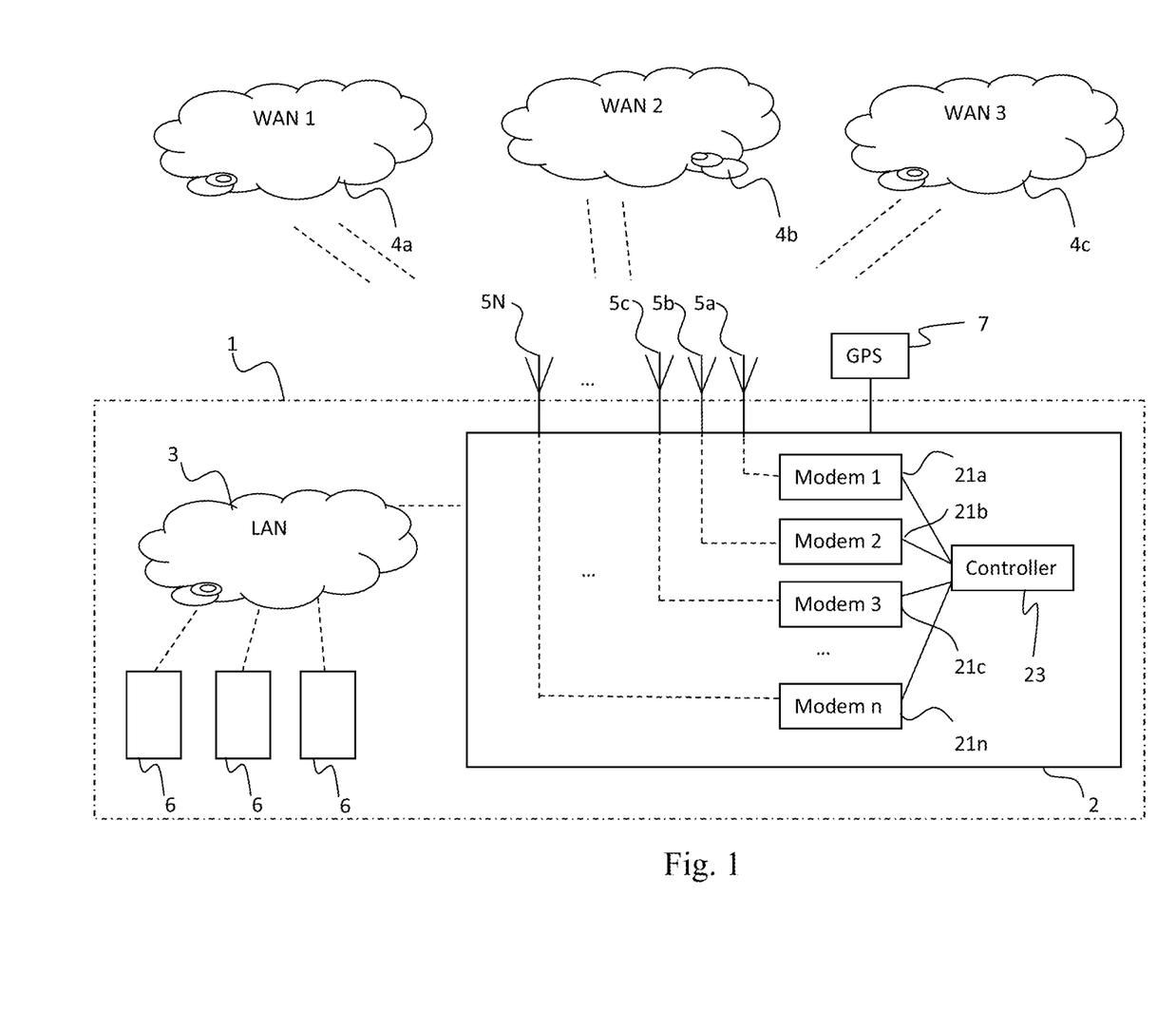
FIG. 1 is a schematic illustration of a train having a wireless communication system in accordance with an embodiment of the present invention.

FIG. 1 shows a schematic illustration of a vehicle 1, in the form of a train 1, having a plurality of carriages 11. The number of carriages may be only two, but more carriages, such as 3, 4, 5 or even more may also be used.

The train 1 has a communication system comprising at least one data communication router 2, or simply router 2, arranged in at least one of the carriages 11 of the vehicle 1. The data communication routers 2 may also be denominated MAR (Mobile Access Router) or MAAR (Mobile Access and Applications Router).

The router 2 is configured to receive and transmit wireless data communication to and from a stationary communication server through at least one exterior mobile network 4a-4c, e.g. external wide area networks (WANs), as indicated by the dashed arrows. Communication to and from the exterior mobile networks 4a-4c is provided via one or several antennas 5a-5N. The exterior mobile network(s) 4a-4c accordingly provides one data link or several data links between the router 2 and the stationary communication server. In the case where two or more data links are available they can either be between the router 2 and one of the exterior mobile networks 4a-4c and/or by using several exterior mobile networks 4a-4c simultaneously.

Moreover, the router 2 is configured to receive and transmit data packets to and from one or more clients 6 onboard the vehicle 1 through an internal local area network (LAN) 3. The LAN 3 will be discussed in further detail in the following and provides one or several internal antennas to communicate with clients 6 or terminal units 6 within the vehicle 1. The client(s) may be computing devices such as laptops, mobile telephones, PDAs and so on.

The communication system further comprises one or several controllers 23, in this illustration arranged as an integrated part of the router 2, configured to evaluate a set of performance parameters of the data link(s) between the router 3 and the exterior mobile network(s) 4a-4c. The controller assigns data streams to the different data links through the router 2 at least partly based on this evaluation of the performance parameters.

The router 2 is preferably arranged to communicate on several different communication routes having different characteristics. The different communication routes to and from the exterior mobile network(s) 4a-c may e.g. be owned by different network operators. The various data streams can be transferred and distributed among the different data links, based on e.g. available bandwidth, such that clients 6 onboard the train 1, are always sure to receive the best data connection available.

The transferring of data streams through different data links may additionally or alternatively comprises the two main steps: evaluation and assignment. Each of these permits some variability. Numerous types of tests, generating a predictable response, such as an echo, could be performed to evaluate link quality, and such tests can be combined in any order, serially or in parallel. The following are only examples.

Any of a variety of common Internet functions can be taken to indicate the usefulness of a link. For example, a WWAN Internet service provider (ISP) will normally offer the addresses of one or more domain name system (DNS) servers, an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

If the queried DNS server belongs to the ISP, the latter will often indicate a severe problem at the ISP for that specific link. Because a DNS request typically consists of a single UDP or TCP packet going each way, this type of test is very light. The infrastructure typically prioritize DNS queries and DNS responses highly in traffic control algorithms, which is another reason why this type of test can be expected to complete very quickly, if at all. The timeout on it can therefore be set very low, producing high responsiveness. The lightness of a DNS test is both an advantage and, to some extent, a drawback. It detects qualitative problems, and is very quick. It also results in a low transfer of data, and does not strain the link, which in turn means that the tests can be repeated very frequently. However, because it does not strain the link, it is a poor indicator of quantitative performance.

Another example of an embodiment therefore uses the ICMP protocol. In this protocol, an ECHO_REQUEST datagram is used to elicit an ECHO_RESPONSE from an arbitrary remote host, preferably a very stable one.

In normal use, ICMP testing is light in the same way as DNS testing. In addition, it is easier for ISPs to prioritize ICMP in unknown ways, because it is a special protocol and does not represent an essential service. Unpadded ICMP requests are likely to receive a very high priority, because ICMP is a standard test of network latency. When highly prioritized, it gives the illusion of good overall responsiveness, while payload data in other types of containers gets a lower priority and relatively poor performance in case of congestion.

As part of the protocol, ICMP packets can be padded with extra bytes of data. This provides a simple, universally recognized method of loading down a link with a very precise burst of traffic, and timing the response. The fact that one and the same packet constitutes the load and is timed is the greatest virtue of this test, because it measures how heavy traffic on a link will actually be treated. In practice, there is often a substantial difference in how a stream of ICMP packets is treated, depending on their size. When padded packets fail to arrive under a given timeout, this is an indicator of performance problems.

The ICMP request may be sent to any type of stationary communication server accessible through the exterior network, such as a DNS server, a gateway through which the communication from the moving vehicle is transferred, a content provider server, or the like.

These embodiments for evaluation mentioned thus far can be generalized as one: any active sending of a request or other provocation across a network, through a specific link, with the expectation of receiving a response under a timeout or corresponding safeguard. Variations on this theme include factors such as protocol, target host location, the amount of traffic sent and solicited, and the precise limit set by the timeout function. Obviously, factors external to the individual test, such as the interval between repetitions of the same type of test, is also a potential subject of fine tuning. These and other methods for evaluation are known from EP 2 943 011 by the same applicant, said document hereby incorporated by reference.

In addition or as an alternative, the evaluation can also be made on the pay-load, i.e. the transmitted data streams, by identification and evaluation of response times, etc.

The system may also comprise a global positioning system (GPS) receiver 7 for receiving GPS signals indicative of the current position of the vehicle, and wherein the controller may be arranged to assign data streams to various data links also partly in dependence on said received GPS signals.

Furthermore, the router preferably comprises a plurality of SIMs. The number of SIMs is preferably at least two, such as e.g. four, six, ten or twelve. The SIMs may form a common SIM pool, accessible for each of the modems 21a-n within the router 2. The SIMs are preferably SIM cards, and the SIM pool may be realized as a SIM card holder, comprising a plurality of slots for receiving a plurality of SIM cards. Periodical assignment of one or several of the SIM(s) to any modem is controlled by the controller(s) 23.

The assignment of SIMs to modems at every specific time is preferably determined based on a set of rules in the controller. The set of rules may e.g. be used to assign SIMs to the modems based on information such as in which country the vehicle is currently travelling, the amount of data that has been conveyed by use of the different SIMs, the current price related to conveying data through the different SIMs, the type of data being conveyed, etc.

The controller 23 is preferably arranged to assign each SIM within said SIM pool only to one modem within the router at a time. Hereby, each SIM at any given time only has one user, but the assigned user may vary over time.

The pooling of SIM cards within a single router is per se known from EP 2 518 977, by the same applicant, said document hereby incorporated by reference.

The internal network will now be discussed in further detail with reference to FIGS. 2-8.

Figure 2:
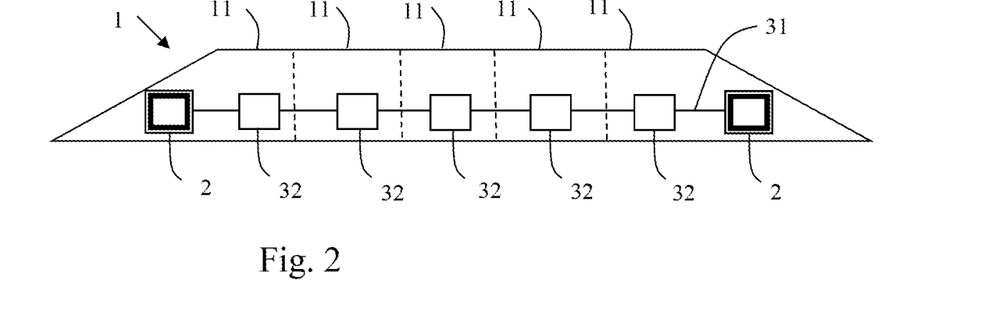
FIGS. 2-4 are schematic illustrations of internal networks of a train in accordance with embodiments of the present invention.
Figure 3:
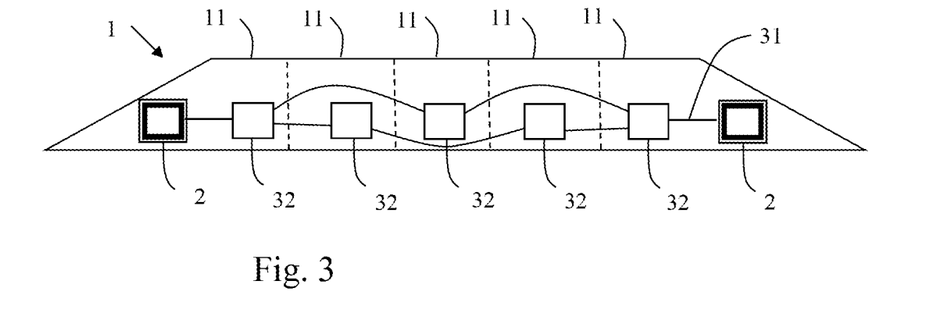
Figure 4:
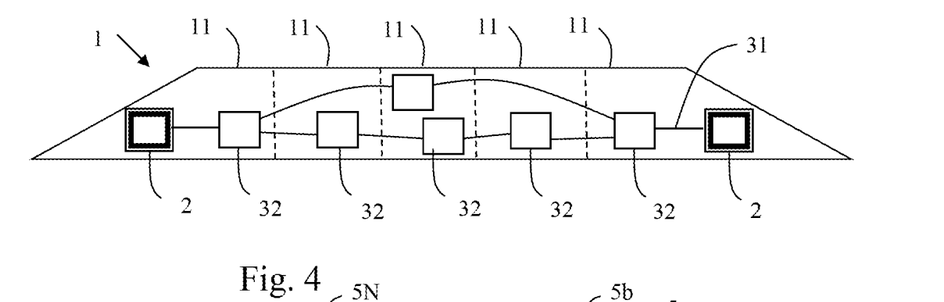

As shown in FIGS. 2-4, the internal network 3 forms a wired path, an Ethernet backbone, for forwarding data communication between the router(s) 2 and one or several clients onboard the moving vehicle. The internal network 3 comprises a plurality of network switches 32, connected together by cables 31. The cables may e.g. be twisted pair cables with metal conductors. However, other cables are also feasible, such as coaxial cables or fiber optic cables.

The one or several carriages where the router(s) 2 are arranged may be referred to a master carriages or master coaches, and the other carriages as slave carriages or slave coaches. In a preferred embodiment, as shown in FIGS. 2-4, two routers 2 may be provided, and preferably arranged in the front end and back end of the vehicle, i.e. in the first and last of the carriages, with slave carriages therebetween.

When several routers are used in the vehicle, the routers may operate relatively independently of each other. Alternatively, the routers may be operated in co-operation, e.g. in the way disclosed in US 2018/020334, said document hereby being incorporated in its entirety by reference.

The internal network may be arranged as a daisy-chain configuration, connecting the switches in a single chain, from a first switch, connected to a router, to a last switch, possibly also connected to a router, if more than one router is provided, and with the intermediate switches being connected between the first and last switch. Such a configuration is schematically illustrated in FIG. 2.

In another embodiment, the network switches are connected through the cables in a redundant ring configuration, as schematically illustrated in FIG. 3. In such an embodiment, every switch has two possible paths to reach any one of the routers. This increases the robustness of the system.

In cases where it is critical to maintain functionality of the switch in a certain carriage, such a carriage may be provided with more than one switch, as illustrated in FIG. 4, where the center carriage has been provided with two switches. Such arrangements may e.g. be used when critical equipment I connected to the switches, in order to provide extra redundancy.

The network switches 32 are PoE capable. Each switch has, at a minimum, one port connected to an upstream switch or a router, one port connecting to a downstream switch or a router, and at least one port connecting to local resources. The network switches are preferably 10 Gigabit (10G) Ethernet switches, operating in accordance with the IEEE 802.3 standard. However, it may also be used for other types of switches, such as 1 Gigabit (1G) Ethernet switches.

Figure 5:
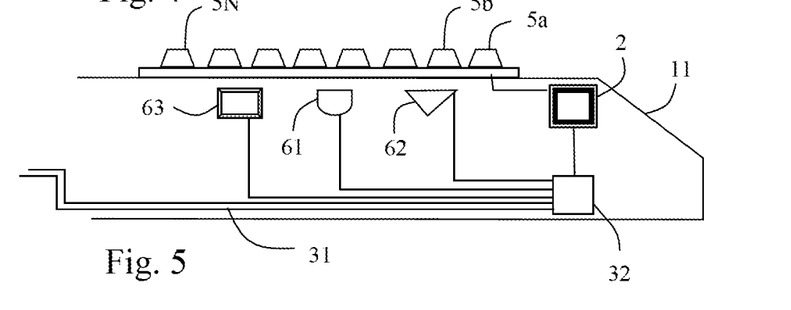
FIGS. 5-7 are schematic illustrations of various exemplary parts of internal networks in accordance with embodiments of the present invention.

FIG. 5 schematically illustrate an embodiment of a front carriage 11 of a train, where the carriage is a master coach. The carriage is provided with a router 2, such as a 5G aggregation router. The router 2 is connected to a set of antennas 5a-5N, here arranged on a support beam arranged on the roof of the train. The antenna set may be an antenna array, preferably configured for MIMO, such as a 4×4 MIMO array, comprising 16-32 antennas. The router is also connected to a network switch 32, such as a 1G or 1oG PoE network switch.

The network switch 32 is here connected to a local resource in the form of a wireless access point 61, such as a multi-radio access point, e.g. a 3 Radio, 4×4 MIMO 802.11ax/Wi-Fi 6 access point.

The wireless access point is preferably a Wi-Fi access point, operating in accordance with an IEEE 802.11 standard. Preferably, all, or almost all, of the network switches have ports connected to such wireless access points.

By the provision of wireless access points, a set of internal LANs may be provided inside the moving vehicle for providing wireless communication between the router, via the network switches, and at least one client (sometimes referred to as terminal) onboard, such as smartphones, laptops, tablets and the like.

The network switch 32 may also be connected to other local resources, here illustrated as a security camera 62 and a display 63. However, other types of local resources are also feasible, such as speakers, light controls, etc.

Further, the network switch is connected to other network switches, e.g. arranged in different carriages, by cables 31.

Figure 6:
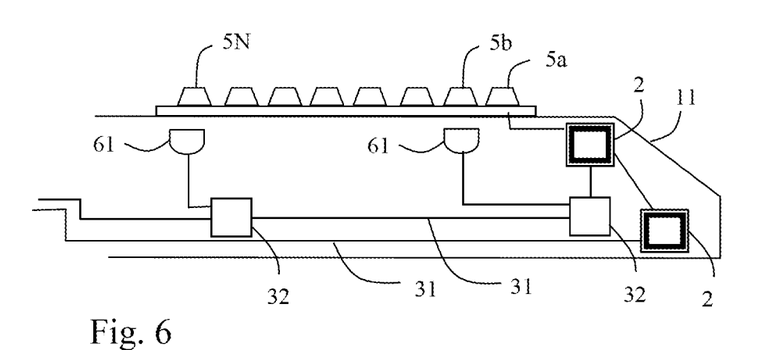

FIG. 6 schematically illustrate another embodiment of a front carriage 11 of a train, where the carriage also is a master coach. The carriage is here provided with two routers 2, such as 5G aggregation routers. Both routers 2 are connected to the set of antennas 5a-5N. The two routers provide increased reliability and security of the system by the additional layer of redundancy.

In this embodiment, the carriage is further provided with two network switches 32, also for increased reliability, and as an extra layer of redundancy. Each of the network switches 32 are here connected to a wireless access point, thereby providing two wireless LANs in the carriage. This is useful for situations where one access point cannot cover the entire carriage, such as in carriages having several levels, so-called double-deck installations, or if the coach is divided into separate sections with glass or metallic doors between them. However, it may also be used to form two concurrently useable wireless LAN connections for the clients, thereby providing additional redundancy and reliability.

Figure 7:
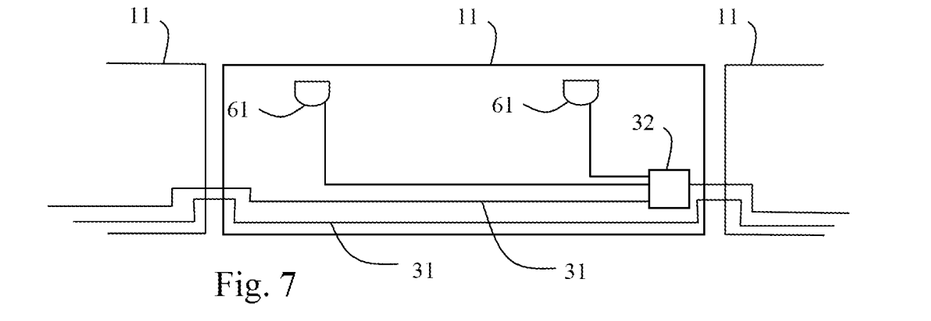

However, two or more access points may also be connected to a single network switch 32. Such an embodiment is schematically illustrated in FIG. 7. In this embodiment, the carriage 11 is a slave coach, i.e. one of the carriages without any router. The Network switch 32 is here connected to two different access points 61.

Figure 8:
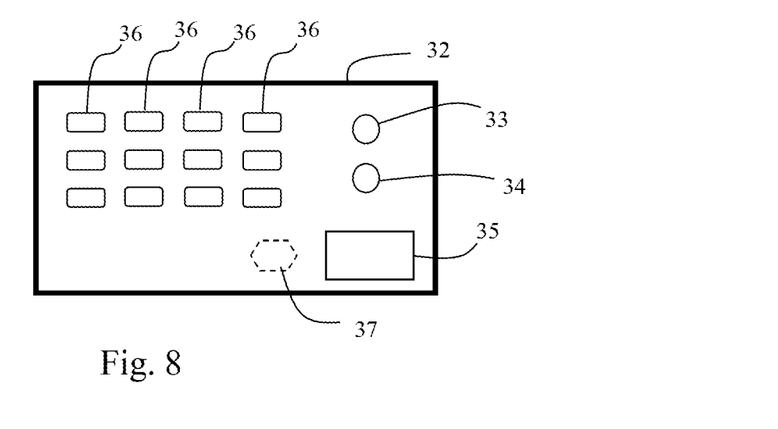
FIG. 8 is a schematic illustration of an interface of a network switch in accordance with an embodiment of the present invention.

An interface for the network switches is schematically illustrated in FIG. 8. Each network switch comprises a first port 33 connectable to another network switch or to the router. This port 33 may be an "Ethernet in" port, i.e. a port to receive data from other switches and routers. There is further a second port 34 connectable to another network switch or to the router. This port 34 may be an "Ethernet out" port, i.e. a port to send data to other switches and routers.

The network switch further comprises a power supply, or a power inlet 35 for externally supplied power.

In addition, the network switch comprises at least one additional port 36 connectable to a wireless access point and/or a local resource device. Preferably, several such additional ports are provided, to enable the switch to connect to many different access points and/or local resource devices, such as 4 or more additional ports, and preferably at least 10 or more additional ports.

The network switches 32 are further provide with a detection element 37, arranged to be activated, i.e. switch state, when input power on the power inlet 35 falls below a minimum power level. The detection element may be realized in hardware and/or software, such as by an electronic circuit, or with a controller connected to a sensor or the like.

When the detection element is activated in a network switch, the network switch is arranged to receive power from at least one of the other network switches through the first port 33 and/or the second port 34, and to continue at least part of its operation also when powered by the at least one other network switch.

Hereby, in the event of a power failure, the switches will be continuing their operation, at least to some extent, powered by the network switch being arranged upstream or downstream from the switch experience a failure. The power is supplied by the Ethernet cable, as Power over Ethernet.

Hereby, an active bypass may be provided allowing data to be forwarded through the failed switch in the same way as before the failure.

In addition to providing a bypass of data through the switch, the switch with the failure may still continue with some, or even all, of its other operations. Thus, it may still be used for at least continuing with its most crucial operations. For example, it may continue to service local resource devices of importance to maintain security and safety onboard the vehicle, such as surveillance cameras, displays to provide information to the passengers, etc. It may also continue to operate a wireless access point, to enable wireless communication for the passengers. However, other local resource devices, and in particular devices requiring much power, could be disconnected. Thus, the network switch may be arranged to restrict or prohibit PoE in the failure mode. For example, PoE may be restricted to at least one of:

To be available only on one or several predetermined ports of said additional ports, for example ports known to be connected to certain local resources of special importance.

To be available only on ports where the power level is below a predetermined maximum power level.

To be available only to predetermined types of local resource devices.

Thus, each switch has a detection element, a circuit, which detects the status of the input power. When input power is good, the switch will provide POE power to all ports except that ports connected to the upstream and downstream switches, and power its associated circuitry from its input supply. When the input power fails, the detection element will enable a power path from the cable connected to the upstream and/or downstream switch, thereby allowing at least some of the functionality of the switch to be maintained even in the failure case. In this failing case, the circuit may also disable PoE power to some or all of the ports. This will, in the event of failure and disabling of some of the ports, cause the switch to become an active Ethernet repeater, or a switch with reduced operation.

The invention has now been described with reference to specific embodiments. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A wireless communication system for a moving vehicle having a plurality of carriages, said wireless communication system comprising:
    at least one internal network onboard said vehicle;
    at least one router, connected to said internal network, and configured to: receive and transmit wireless data communication to and from a stationary communication server outside said moving vehicle through at least one exterior mobile network via at least one antenna, wherein said at least one exterior mobile network provides at least one data link; and receive and transmit data packets to and from at least one client onboard the moving vehicle through at least one internal network;
    wherein said internal network comprises a plurality of network switches, connected together by cables, wherein the network switches are Power over Ethernet (PoE) switches, each network switch comprising:
    a first port connectable to another of said plurality of network switches or to the router;
    a second port connectable to another of said plurality of network switches or to the router;
    at least one additional port connectable to a wireless access point and/or a local resource device;
    a power inlet, for receiving power from a power supply; and
    a detection element arranged to be activated when input power on said power inlet falls below a minimum power level,
    wherein upon activation of said detection element, each network switch is further arranged to receive power from at least one of the other network switches through said first and/or second ports, and to continue at least part of its operation also when powered by the at least one other network switch,
    wherein at least one network switch is arranged, upon activation of said detection element, to become a switch with reduced operation, wherein Power over Ethernet is restricted or prohibited through said at least one additional port, such that wherein Power over Ethernet is available only to predetermined types of local resource devices, and
    wherein, upon activation of said detection element, Power over Ethernet is restricted to be available only on ports where the power level is below a predetermined maximum power level.

2. The wireless communication system of claim 1, wherein the at least some of said plurality of network switches are arranged in different carriages of the moving vehicle.

3. The wireless communication system of claim 1, wherein the network switches are connected through said cables in a daisy chain configuration.

4. The wireless communication system of claim 1, wherein the network switches are connected through said cables in a redundant ring configuration.

5. The wireless communication system of claim 1, wherein the network switches are arranged, upon activation of said detection element, to continue to forward data communication received on said first port to said second port when powered by the at least one other network switch.

6. The wireless communication system of claim 1, wherein the network switches are arranged, upon activation of said detection element, to continue to send or receive data communication through at least one of said additional port(s).

7. The wireless communication system of claim 1, wherein, upon activation of said detection element, Power over Ethernet is restricted to be available only on one or several predetermined ports of said additional ports.

8. The wireless communication system of claim 1, wherein, upon activation of said detection element, Power over Ethernet is restricted to be provided only to predetermined, safety critical local resource devices.

9. The wireless communication system of claim 1, wherein the network switches are arranged, upon activation of said detection element, to prohibit outgoing Power over Ethernet on all the additional ports.

10. The wireless communication system of claim 1, wherein the network switches are 10 Gigabit Ethernet switches, operating in accordance with the IEEE 802.3 standard.

11. The wireless communication system of claim 1, wherein the cables are twisted pair cables with metal conductors.

12. The wireless communication system of claim 1, wherein the moving vehicle is a train.

13. The wireless communication system of claim 1, wherein at least one of the network switches has at least one of said additional ports connected to a wireless access point.

14. The wireless communication system of claim 13, wherein the wireless access point is a Wi-Fi access point, operating in accordance with an IEEE 802.11 standard.

15. A method for operation of a wireless communication system for a moving vehicle having a plurality of carriages, said wireless communication system comprising:
    at least one internal network onboard said vehicle;
    at least one router, connected to said internal network and to at least one exterior mobile network, wherein said internal network comprises a plurality of network switches, connected together by cables, wherein the network switches are Power over Ethernet (PoE) switches;
    wherein each network switch comprises:
    a first port connectable to another of said plurality of network switches or to the router,
    a second port connectable to another of said plurality of network switches or to the router, and at least one additional port connectable to a wireless access point and/or a local resource device;

the method in one of said network switches comprises:
- determining if an input power received from a power supply is below a minimum power level;
- receiving, in case it has been determined that the input power level is below said minimum power level, power as Power over Ethernet from at least one of the other network switches; and
- continuing at least part of the network switch operation also when powered by the at least one other network switch, wherein at least one network switch is arranged, when determined that the input power level is below said minimum power level, to become a switch with reduced operation, wherein Power over Ethernet is restricted or prohibited through said at least one additional port, wherein Power over Ethernet is available only to predetermined types of local resource devices, and wherein, when determined that the input power level is below said minimum power level, Power over Ethernet is restricted to be available only on ports where the power level is below a predetermined maximum power level.

16. The method of claim 15, wherein, upon the determining that the input power received from the power supply is below said minimum power level, Power over Ethernet is restricted to be available only on one or several predetermined ports of said additional ports.

17. The method of claim 15, wherein, upon the determining that the input power received from the power supply is below said minimum power level, Power over Ethernet is restricted to be provided only to predetermined, safety critical local resource devices.

18. The method of claim 15, wherein the network switches are arranged, upon the determining that the input power received from the power supply is below said minimum power level, to prohibit outgoing Power over Ethernet on all the additional ports.

19. The method of claim 15, wherein the moving vehicle is a train.

* * * * *